(12) United States Patent
Kutsche et al.

(10) Patent No.: US 8,796,569 B2
(45) Date of Patent: Aug. 5, 2014

(54) FLEXIBLE COVER FOR CONTACTS OF A PLUG-IN OR WITHDRAWABLE UNIT

(75) Inventors: Wolfgang Kutsche, Weilserswist (DE); Ralph Kriechel, Alfter (DE); Erik Bogdon, Carnegie, PA (US); Aaron Kozar, Zelienople, PA (US); Craig Rodgers, Imperial, PA (US)

(73) Assignee: Eaton Industries GmbH, Bonn (DE)

( * ) Notice: Subject to any disclaimer, the term of this patent is extended or adjusted under 35 U.S.C. 154(b) by 552 days.

(21) Appl. No.: 13/042,512

(22) Filed: Mar. 8, 2011

(65) Prior Publication Data

US 2012/0228095 A1   Sep. 13, 2012

(51) Int. Cl.
  *H01H 9/00*    (2006.01)
(52) U.S. Cl.
  USPC ........................................................ 200/50.22
(58) Field of Classification Search
  USPC ......... 200/50.22, 50.26, 50.21, 400; 439/140, 439/700, 66, 246, 824; 361/608, 617, 605, 361/609, 615, 673
  See application file for complete search history.

(56) References Cited

U.S. PATENT DOCUMENTS

| | | | | |
|---|---|---|---|---|
| 3,920,939 A | * | 11/1975 | Ciboldi et al. | ............. 200/50.22 |
| 6,031,191 A | | 2/2000 | Ahlert et al. | |
| 6,663,439 B2 | * | 12/2003 | Henry et al. | .................. 439/700 |
| 7,067,747 B2 | | 6/2006 | Deylitz et al. | |
| 7,285,026 B1 | * | 10/2007 | Ju et al. | .......................... 439/700 |
| 7,440,259 B1 | * | 10/2008 | Deylitz et al. | ................. 361/617 |
| 2009/0000926 A1 | | 1/2009 | Buxton et al. | |

FOREIGN PATENT DOCUMENTS

WO         02/087041 A1    10/2002

* cited by examiner

*Primary Examiner* — Edwin A. Leon
(74) *Attorney, Agent, or Firm* — Leydig, Voit & Mayer, Ltd.

(57) ABSTRACT

A shutter for insulating electrical contacts includes a first panel having a first opening and a second panel having a second opening. The first opening is offset from the second opening when the shutter is in a closed position. The second panel includes a first guide configured to react to a pressure of a phase barrier of an insertable withdrawable unit thereon to move the second panel in a first sliding direction relative to the first panel such that the first and second openings align so as to allow an electrical contact to extend therethrough. A spring housing having a spring disposed therein between at least two support legs is slidably disposable in the first panel and extends through the second panel.

22 Claims, 9 Drawing Sheets

US 8,796,569 B2

FLEXIBLE COVER FOR CONTACTS OF A PLUG-IN OR WITHDRAWABLE UNIT

FIELD

The present invention relates generally to a flexible cover, or shutter, for insulating contacts of a plug-in or withdrawable unit.

BACKGROUND

Switchgears are a combination of electrical components, such as switches, fuses and circuit breakers, which are used in electrical systems to connect and disconnect all or part of the electrical systems. Electrical cabinets, for example, for a plant, often house one or more switchgears for different electrical systems, operated by one or more sources of power, which are controlled by the switchgears. These switchgears can be provided as plug-in or withdrawable units that are installed into the cabinets so as to electrically connect to main and auxiliary contacts within the cabinet.

In order to prevent accidental touching and dangerous exposure to the active electrical contacts in the cabinet, in particular when inserting or removing withdrawable units, or when not all available spaces within the cabinet are in use, the contacts of the cabinet are covered by an insulating screen. This insulating screen can be a flexible cover or shutter which completely covers the contacts in a closed state and exposes the contacts in an open state. The shutter is formed from an insulating material and protects the contacts from accidental touching until a withdrawable unit is to be installed, during which the shutter opens to expose the contacts and connect the contacts to contact cages of the withdrawable unit in a safe manner. When the withdrawable unit is removed, the shutter transitions again to a closed state. The withdrawable units are used so that it is relatively easy to perform maintenance on switchgears or replace them. To test the protection against direct contact that is provided by the shutter, a test can be performed according to established standards for protection against direct contact and intrusion of foreign particles.

Shutters having various opening and closing mechanisms are known. U.S. Pat. No. 7,067,747 and International Application Publication No. WO 02/087041 describe protective plates which are opened by operating levers. U.S. Pat. No. 6,031,191 describes a protective plate which is opened with pivoting rocker arms. U.S. Patent Application Publication No. 2009/0000926 describes shutter plates that are moved by pivoting-V-shaped linkages attached to a telescoping rod.

SUMMARY

Applicants have discovered that existing shutters do not provide adequate protection since the motion of the shutters are too complex and involve too many components to provide a safe, reliable and consistent opening or closing of the shutters while inserting or removing withdrawable units. In particular, shutters which rely on, for example, levers, rocker arms and telescoping rods introduce forces on the withdrawable unit which are transverse or oblique to the desired motion of the withdrawable unit, which is directly perpendicular to the contacts in the cabinet. Accordingly, it has been determined that the existing shutters can not always provide adequate protection. Moreover, such shutters require many components and are more complex to use and more expensive to make than necessary. Thus, a shutter that is simple, safe and reliable is needed.

In an embodiment, the present invention provides a shutter for insulating electrical contacts including a first panel having a first opening and a second panel having a second opening. The first opening is offset from the second opening when the shutter is in a closed position. The second panel includes a first guide configured to react to a pressure of a phase barrier of an insertable withdrawable unit thereon to move the second panel in a first sliding direction relative to the first panel such that the first and second openings align so as to allow an electrical contact to extend therethrough. A spring housing having a spring disposed therein between at least two support legs is slidably disposable in the first panel and extends through the second panel.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

Like reference numerals are used in the drawing figures to connote like components.

DETAILED DESCRIPTION

Figure 1:
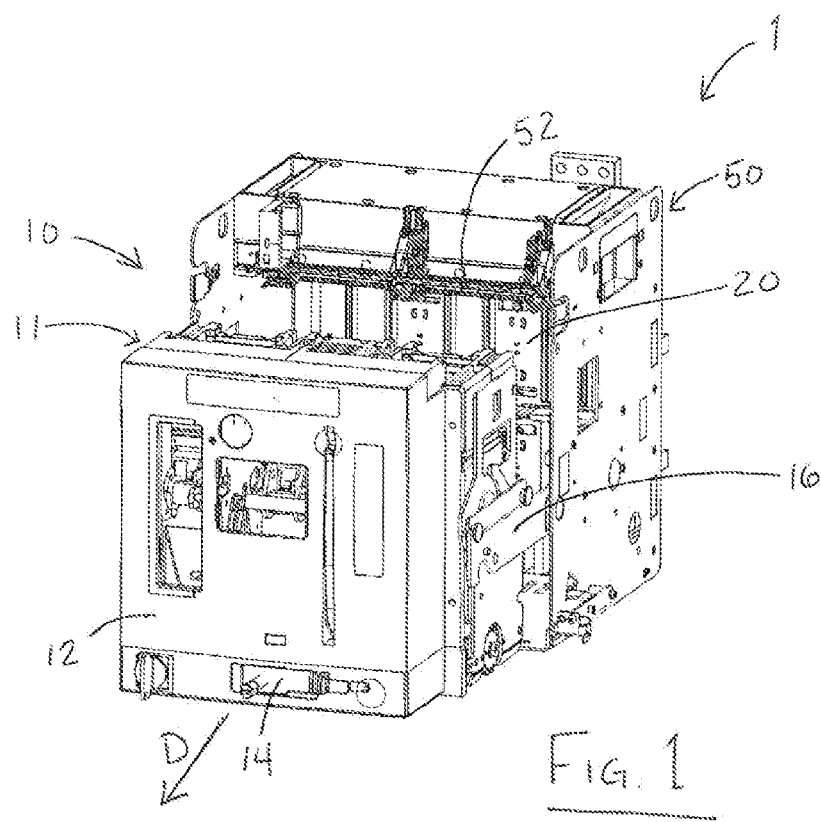
FIG. 1 is a perspective view of a withdrawable unit in a pulled-out position.
Figure 2:
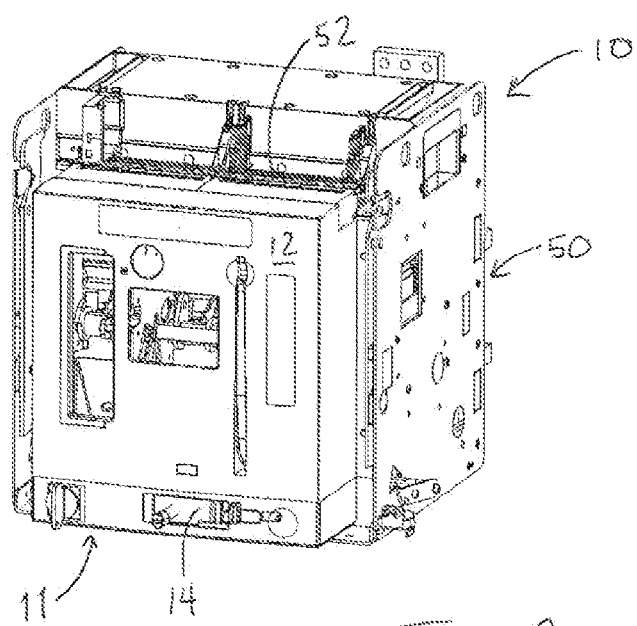
FIG. 2 is a perspective view of the withdrawable unit in a disconnected position.
Figure 3:
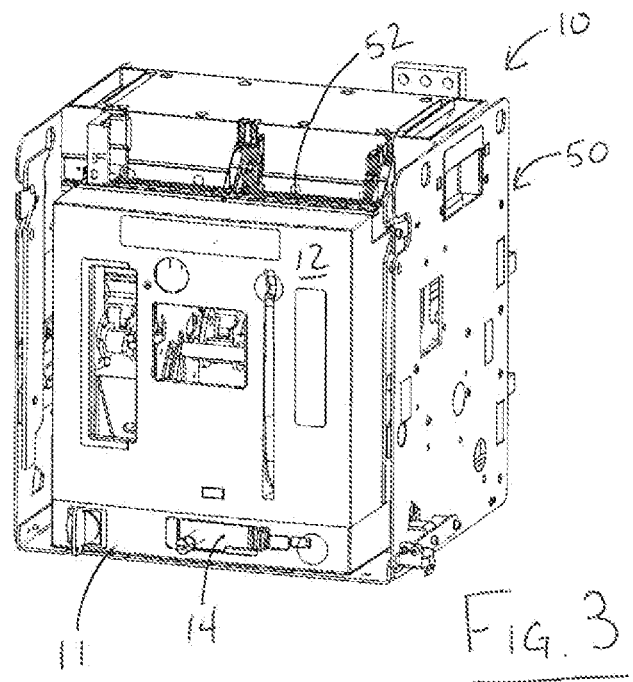
FIG. 3 is a perspective view of the withdrawable unit in a connected position.

Referring to FIGS. 1-3, a switchgear 1 includes a withdrawable unit 10 including, for example, a circuit breaker 14 within the housing of the withdrawable unit 10 at the front withdrawable part 11 thereof. The withdrawable part 11 can be pulled away from or pressed toward a fix-mounted part 50 in direction D. The fix-mounted part 50 is typically mounted in an electrical cabinet adjacent to other withdrawable units. To ensure a controlled motion directly inwards and outwards from the fix-mounted part 50 in direction D, the withdrawable unit 10 can be provided with guide rails 16 or other components that are able to stabilize the withdrawable unit 10 and guide withdrawable part 11 along direction D to the pulled-out position shown in FIG. 1. From the pulled-out position, the withdrawable unit 10 can be removed or pushed inward to a disconnected position shown in FIG. 2 in which the electrical contacts, including auxiliary contacts 52, are not engaged. From the disconnected position, the withdrawable unit 10 can be pressed in further, for example, using a wrecking tool, to a connected position shown in FIG. 3, in which the electrical contacts are connected as explained in further detail below.

Figure 4:
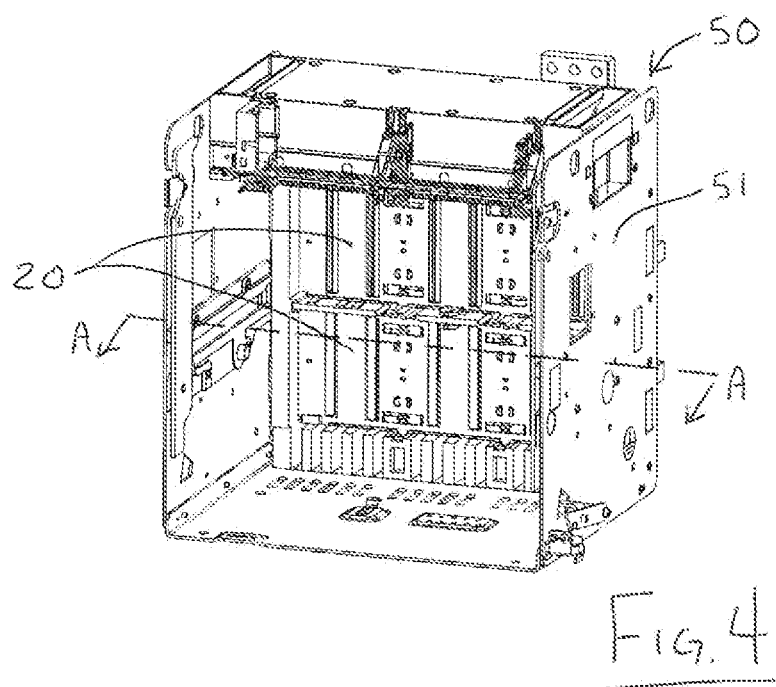
FIG. 4 is a perspective view of the a fix-mounted part of the withdrawable unit.

Referring to FIG. 4, the fix-mounted part 50 of the withdrawable unit 10 is provided to be mounted within an electrical cabinet with the cabinet housing 70 disposed at the back of the fix-mounted part 50. In the embodiment shown, a pair of shutters 20 are disposed in front of the cabinet housing 70 so as to cover electrical contacts of the cabinet housing 70.

Any number of withdrawable units 10 can be provided within an electrical cabinet depending on the number of electrical systems or applications that require control. For example, when operating different machinery, such as a welder or drill press, circuit breakers 14 having different ratings can be provided safely and easily by removing the withdrawable part 11 from the pulled-out position of FIG. 1 and replacing it with a withdrawable part 11 of a withdrawable unit 10 having the desired circuit breaker rating for the application. However, it is undesirable to cut off power since other electrical systems controlled by the electrical cabinet would then be cut off from power as well. Thus, shutters 20 are provided in accordance with an embodiment of the present invention so as to protect the active electrical contacts of the cabinet, during replacement of the withdrawable part 11, from accidental touching. Moreover, where a plant does not use all available connections in the electrical cabinet, the shutters 20 can still be mounted on the cabinet housing 70, with or without the fix-mounted part 50 (see FIGS. 4 and 7, respectively), such that the active electrical contacts are still insulated and protected from accidental touching, even when not in use.

Figure 7:
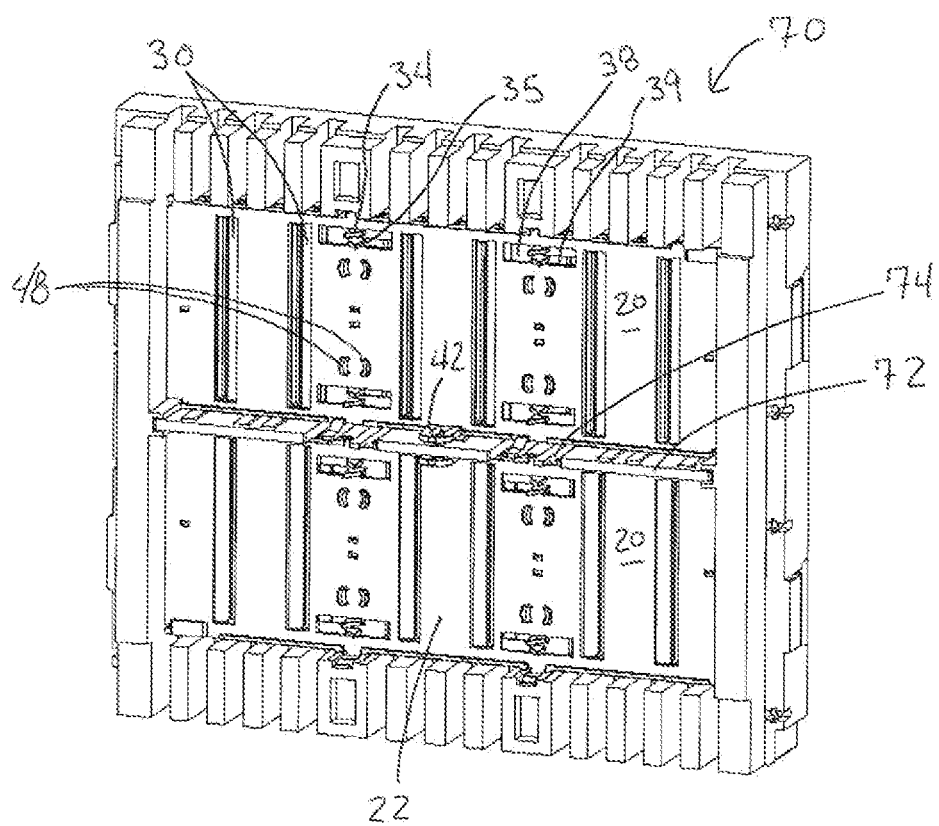
FIG. 7 is a perspective view of the cabinet housing with the shutters in the closed position.

For example, as shown in FIG. 7, an empty space of the cabinet housing 70 can include mounted shutters 20 to protect the active contacts until such time as a withdrawable unit 10 is to be installed to control a new electrical system or application. The cabinet housing 70 can include an extension 72 between the shutters 20 having clips 74 that hold the shutters 20 in the pulled-out and closed position until the installation of a withdrawable unit 10, in which case, the clips 74 also allow for the shutters 20 to be pushed back to the open position. Additionally, lock supports 42 on the shutters 20 can be provided such that a lock can extend through the extension. In an embodiment, the lock supports 42 are U-shaped brackets extending through the shutter 20 which allow for the insertion of a lock through the extension 72 and, if desired, through another adjacent lock support 42 of an adjacent shutter 20. Alternatively, the lock supports 42 on adjacent shutters 20 can be locked directly together. Locks can be desired to prevent unauthorized access to the electrical contacts. For example, locking the shutters 20 can prevent the stealing of electric power or copper components, as well as prevent an unknowing person from accidentally opening the shutters 20.

Figure 5:
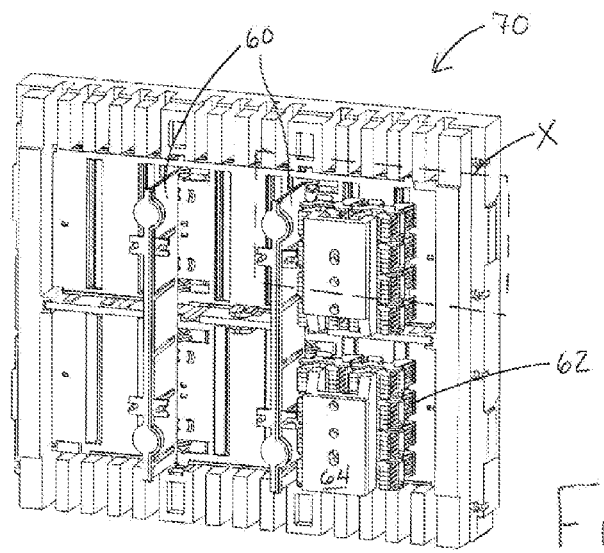
FIG. 5 is a perspective view showing phase barriers and contact cages of the withdrawable unit approaching a pair of shutters installed in a cabinet housing in a pulled-out and closed position according to an embodiment of the present invention.

Referring to FIG. 5, the cabinet housing 70 is shown in greater detail with the shutters 20 being in a pulled-out and closed position. A portion of the withdrawable part 11 is also shown with housing 12 removed in order to illustrate the operation of the withdrawable unit 10. Phase barriers 60, which in the embodiment shown are configured as vertically-oriented blades, are preferably formed from an electrically-insulating material and attached at the rear of the withdrawable part 11. Likewise, contact cages 62 are attached, for example, via contact cage supports 64, made from an electrically-insulating material, to the rear of the withdrawable part 11. However, it is noted that, depending on the electrical standard, such as the IEC standard used in Europe or the UL standard used in the United States, the contact cages 62 can be attached respectively to either the withdrawable unit 10 or the circuit breaker 14.

Figure 6:
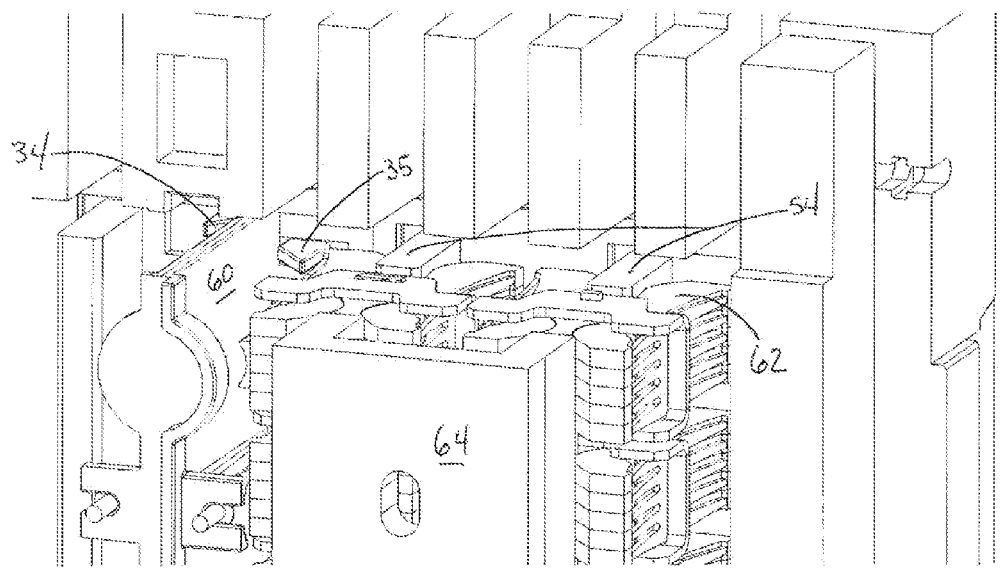
FIG. 6 is a detailed view of detail X of FIG. 5 with the shutter in a pushed back and open position in accordance with an embodiment of the present invention.

FIG. 6 is a detailed view of detail X of FIG. 5, however, with the withdrawable unit 10 having been moved from the disconnected position of FIG. 2 to the connected position of FIG. 3. In having done so, as the withdrawable part 11 is pressed toward the cabinet housing 70, the phase barriers 60 enter between first and second guides 34, 35 of the shutter 20 and move them in opposite directions to transition the shutter 20 to a pressed back and open position of FIG. 6 in which the main contacts 54 extend through openings 30 of the shutter 20. The operation of the shutter 20 is explained in greater detail below with reference to an embodiment shown in FIGS. 10-16. Further, as the withdrawable unit 10 is moved from the disconnected to the connected position, the auxiliary contacts 52 connect and the main contacts 54 engage with the contact cages 62 of the circuit breaker 14.

Figure 8:
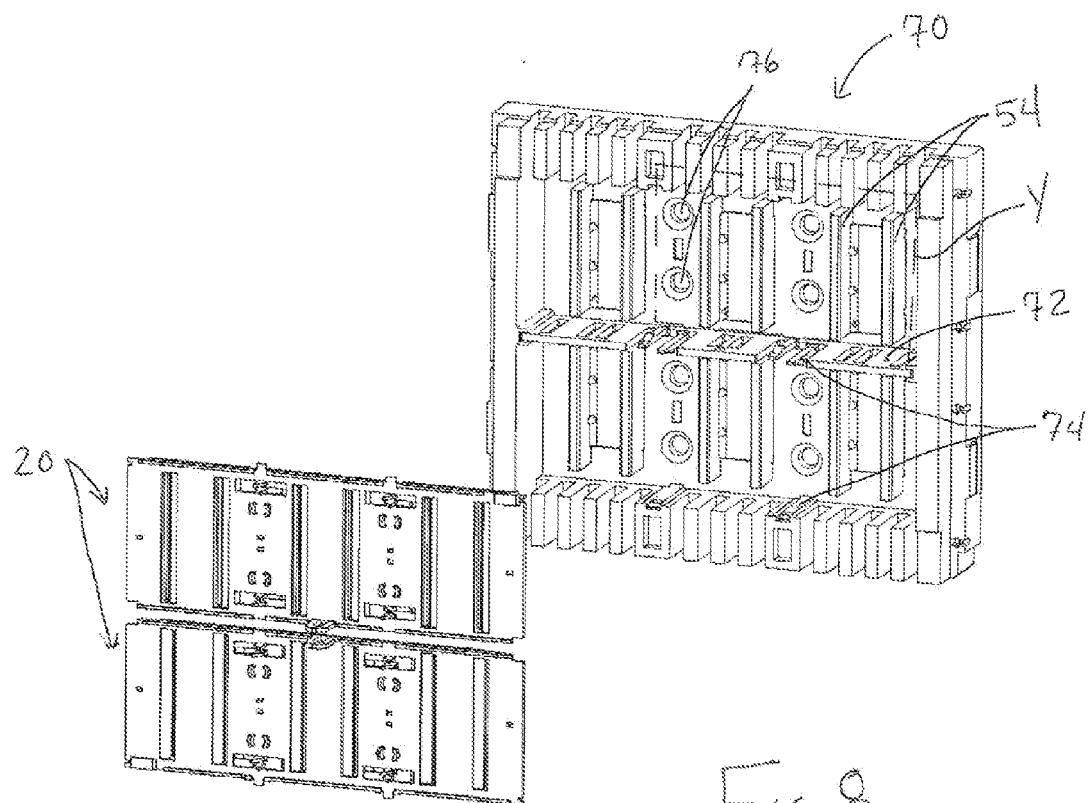
FIG. 8 is an exploded view of the cabinet housing of FIG. 7.
Figure 9:
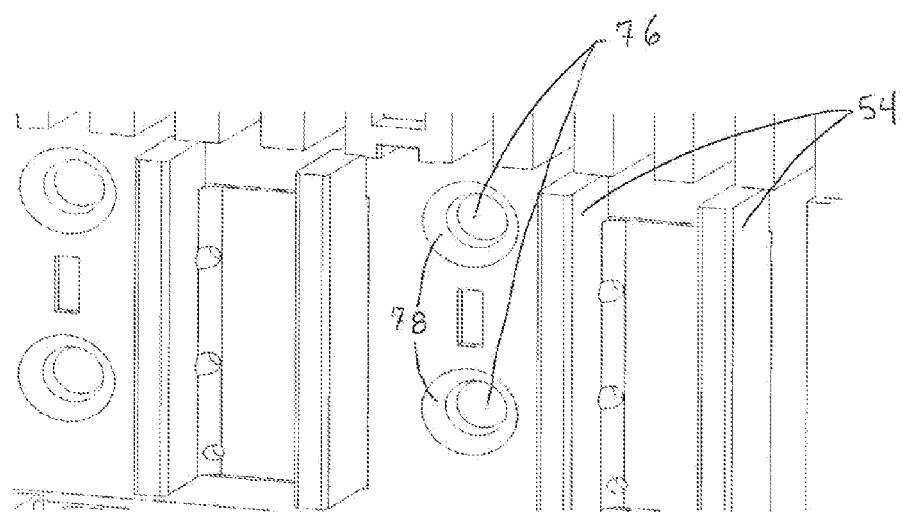
FIG. 9 is a detailed view of detail Y of FIG. 8.

Referring to FIG. 8, the shutters 20 are shown exploded away from the cabinet housing 70 in order to illustrate the interior of the cabinet housing 70. Accordingly, the main contacts 54 which were covered and protected by the shutters 20 are now visible at the rear of cabinet housing 70. Additionally, it can be seen that the extension 74 can also serve as a barrier to electrically insulate between vertically-adjacent main contacts 54. As better shown in FIG. 9, which is a detailed view of detail Y of FIG. 8, mounting holes 76 are disposed between horizontally-adjacent main contacts 54 and can include entering guides 78 for an easier mounting of the shutters 20, as explained below with reference to FIG. 14. Different configurations of main contacts 54 and mounting holes 76 in the cabinet housing 70 are also possible. With different configurations, spring housings 100 can be moved to correspond to the positions of the mounting holes 76 and the positions of phase barriers 60 and/or extensions 72 can also be moved in order to separate adjacent sets of main contacts 54. Moreover, in one embodiment, the mounting holes 76 are not provided.

Figure 10:
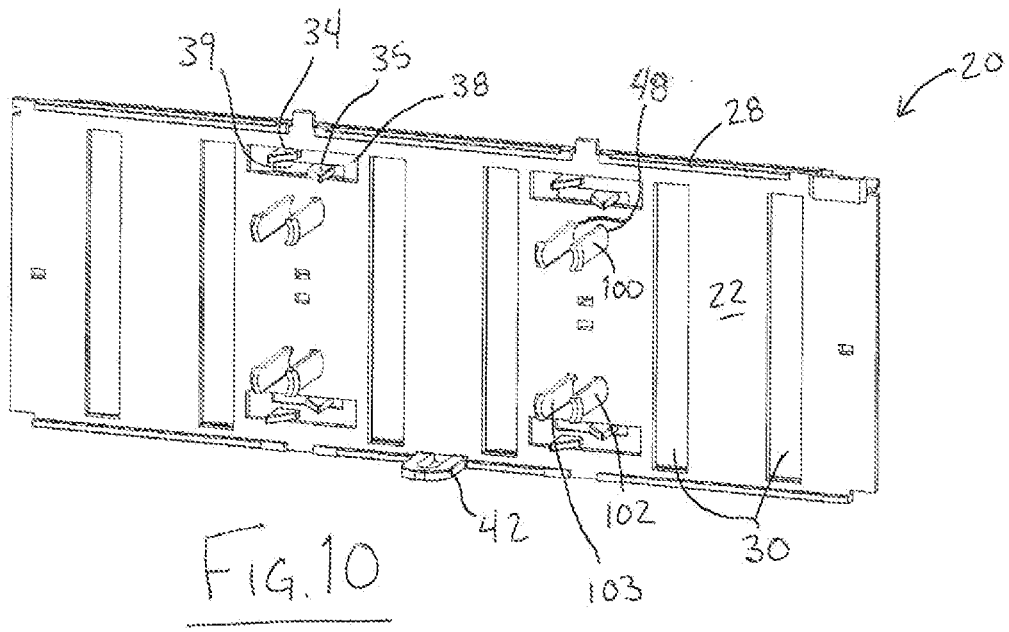
FIG. 10 is a front perspective view of the shutter in the open position.
Figure 11:
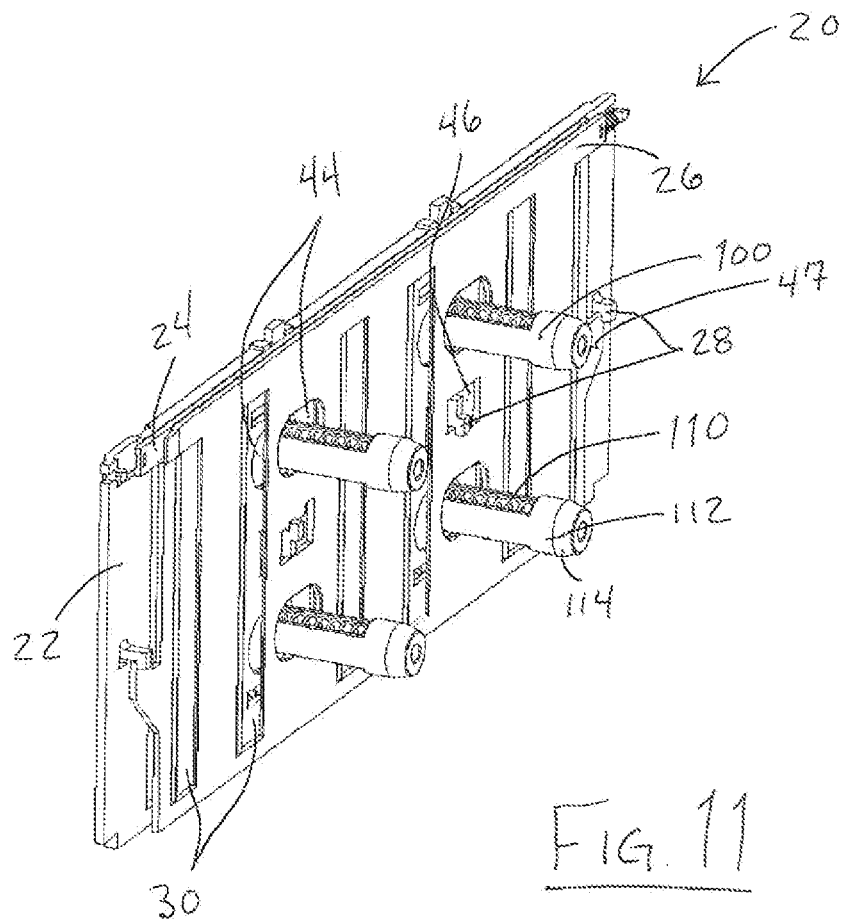
FIG. 11 is a rear perspective view of the shutter in the closed position.

In the embodiment shown in FIGS. 10 and 11, the shutter 20 includes a front panel 22, a middle panel 24 and a rear panel 26. The panels 22, 24, 26 can be slidably retained adjacent to one another using shutter clips 28 disposed at the top and bottom sides of the shutter 20 and/or using shutter clips 28 disposed within the panels which attach to adjacent panels through sliding support holes 46 or at sliding support extensions 47 disposed at the ends of one or more of the panels 22, 24, 26. Additionally or alternatively, rails or guides could be provided at the top and bottom, or between, the panels 22, 24, 26 to hold the panels 22, 24, 26 together and/or to facilitate the relative sliding motion of the panels 22, 24, 26 with respect to each other when opening and closing the shutter 20.

Each of the panels 22, 23, 24 include openings 30 which correspond to the positions of the main contacts 54 when the shutter 20 is in the open position as shown in FIG. 10. When the shutter 20 is in a closed position as shown in FIG. 11, the openings 30 of the each of the panels 22, 24, 26 are offset from one another such that the shutter 20 covers the area in front of the main contacts 54.

The front panel 22 includes spring mounts 48 configured to slidably retain the spring housings 100. In the embodiment shown, the spring mounts 48 are semi-circular holes corresponding to the profile of support legs 102, 103. However, in different embodiments, for example where the spring housing 100 has a different shape such as rectangular with straight support legs 102, 103, the spring mounts 48 could instead be rectangular holes corresponding to the profile of the support legs 102, 103.

The front panel 22 also includes a first aperture 38 through which a first guide 34 disposed on a front face of the middle panel 24 extends. The middle panel 24 includes a second aperture 39 through which a second guide 35 disposed on a front face of the rear panel 26 extends. Each of the apertures 38, 39 are of sufficient size to allow for the lateral sliding of the middle and rear panels 24, 26 when the shutter 20 is opened. Additionally, the middle and rear panels 24, 26 include spring clearance holes 44 through which the spring housings 100 extend and which are likewise of sufficient size to allow for the lateral sliding of the middle and rear panels 24, 26 when the shutter 20 is opened.

Figure 15:
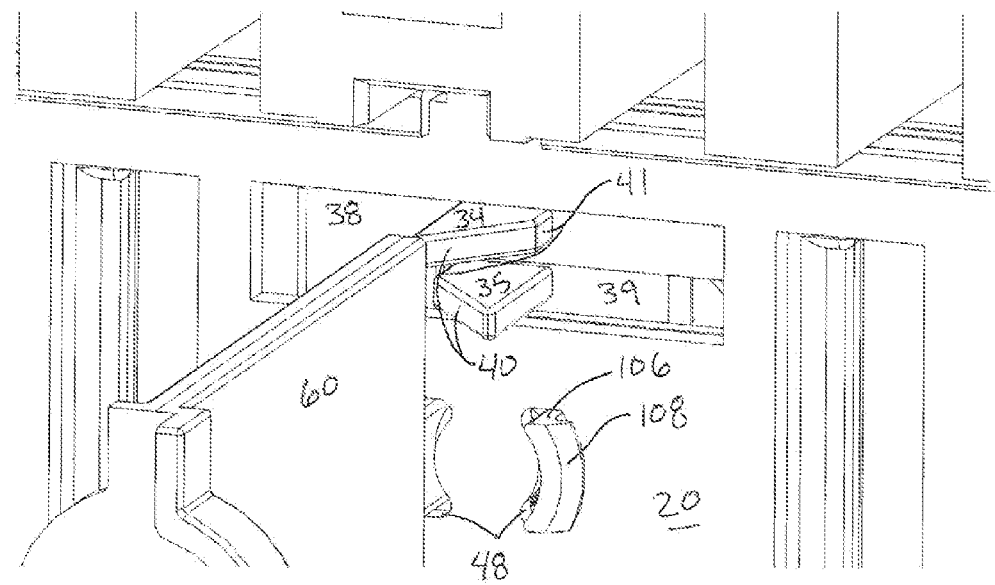
FIGS. 15 and 16 are detailed views of the operation of the shutter in accordance with an embodiment of the present invention and respectively show the phase barriers approaching the shutter and having transitioned the shutter to the pushed back and open position.
Figure 16:
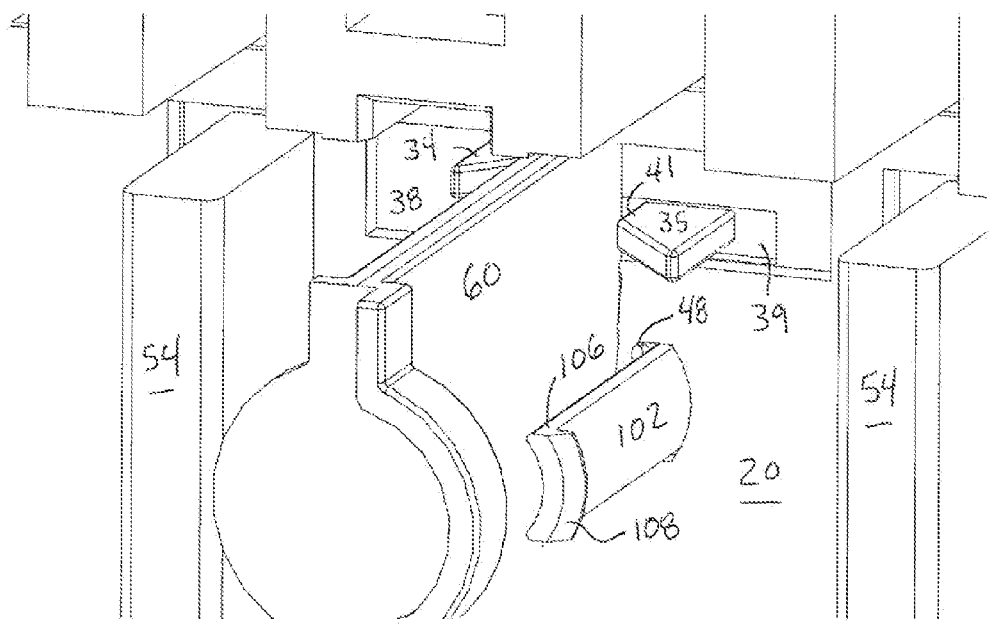

Referring to FIGS. 15 and 16, which respectively show in detailed views the shutter 20 in the closed position and the shutter 20 in the open position, the shutter 20 is opened by the motion of phase barriers 60 of the withdrawable unit 10 when moved from the disconnected to connected position (see FIGS. 2 and 3). As the phase barrier 60 is pushed in with the withdrawable part 11, the phase barrier 60 contacts between the first and second guides 34, 35. In the embodiment shown, the guides 34, 35 are configured as inclined surfaces 40 which overlap in the path of the phase barrier 60 in the motion of phase barriers 60 of the withdrawable unit 10 when moved from the disconnected to connected position. Accordingly, as the phase barrier 60 travels directly inward and down the inclined surfaces 40 of the guides 34, 35, they slide in separate directions with the first guide 34 causing the middle panel 24 to move in a first direction (e.g., laterally left) and the second guide causing the rear panel 26 to move in a second direction opposite the first direction (e.g., laterally right). In this example, the openings 30 of the middle panel 24 can be offset to the right of the openings 30 of the front panel 22 and the openings 30 of the rear panel 26 can be offset to the left of the openings 30 of the front panel 22 such that the relative sliding motion of the middle and rear panels 24, 26 provided by the guides 34, 35 respectively attached thereto cause the openings 30 in each of the panels 22, 24, 26 to align and open the shutter 20. As described above, the first guide 34 of the middle panel 24 slides within the first aperture 38 in the front panel 22 and the second guide 35 of the rear panel 26 slides within the second aperture 38 in the middle panel 24.

Figure 13:
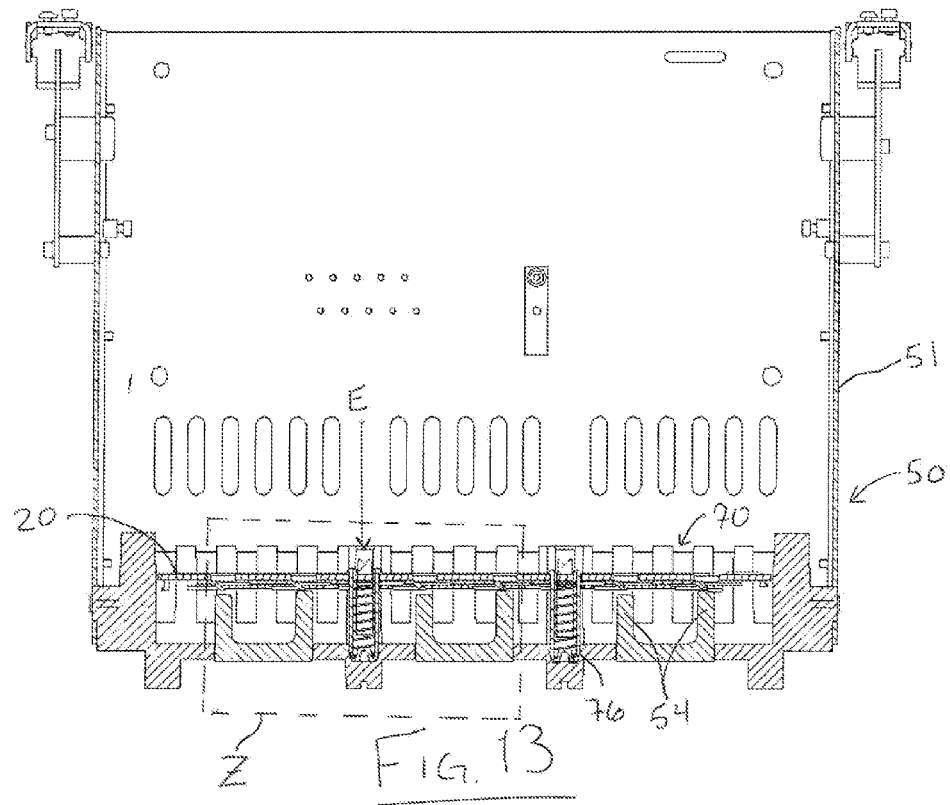
FIG. 13 is a sectional view of the fix-mounted part of FIG. 5 taken along section A-A.

The guides 34, 35 in the embodiment shown also include straight sections 41 below the inclined surfaces 40 which abut the phase barrier 60 once the movement provided by the guides 34, 35 has opened the shutter such that main contacts 54 can extend through the aligned openings 30 of the panels 22, 24, 26. From this opened position of the shutter 20, continued movement of the phase barrier 60 presses the panels 22, 24, 26 of the shutter 20 rearwards toward the cabinet housing 70 so that the main contacts 54 extend through the openings 30 of panels 22, 24, 26, and continues until the shutter is in a pushed back and open position shown in FIG. 16. While the shutter 20 is pushed back, the spring housing 100 remains relatively stationary and thus the spring mounts 48 slide along the support legs 102, 103 as is also shown in FIG. 16. This aids in guiding the shutter directly back towards the cabinet housing 70, especially since a base 112 of the spring housing 100 is maintained in axial alignment by the mounting holes 76 as shown in FIG. 13. Preferably, the openings 30 are at least substantially aligned, and are slightly larger, and shaped similar to, than the profiles of the main contacts 54 to allow some clearance for the main contacts 54 to extend through. However it is also possible to oversize one or more of the openings 30 on one or more of the panels 22, 24, 26.

Other types of guides 34, 35 are also possible. For example, the guides 34, 35 can be arcuate, with or without straight sections 41. Further, in an embodiment having only a front panel 22 and a rear panel 26, only guide 35 is provided. In this embodiment, the guide 35 can be longer in order to effect a greater lateral movement of the rear panel 26 relative to the stationary front panel 22, if necessary, to align openings 30 such that the main contacts 54 are able to extend therethrough. Further, a rotational opening of the shutter 20 is also possible. For example, the guides 34, 35 can be provided along an opening, such as apertures 38, 39, that is configured as an arcuate path to rotate the middle and/or rear panel 24, 26 so that the openings 30 of the panels 22, 24, 26 align sufficiently for there to be enough space through which the main contacts 54 can extend.

Figure 12:
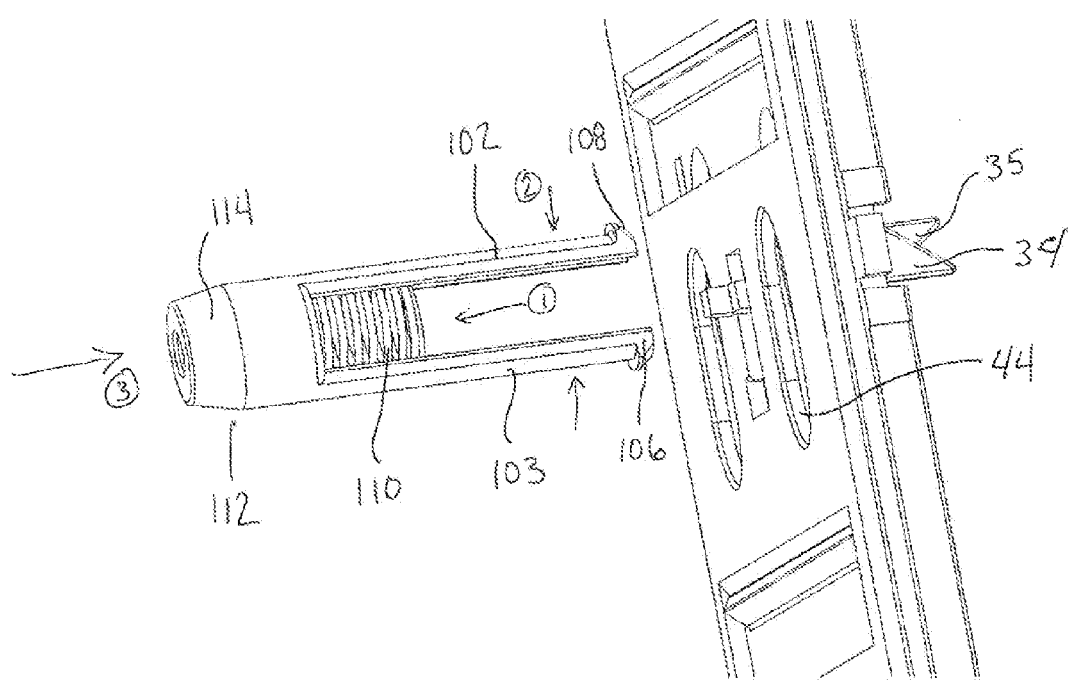
FIG. 12 is a detailed view of a spring and spring housing being installed into the shutter according to an embodiment of the present invention.

The assembly of the spring housing 100 into the shutters 20 in accordance with an embodiment of the present invention will be explained with reference to FIG. 12. In a first step, a spring 110 disposed between the support legs 102, 103 is compressed toward a base 112 of the spring housing 100. In a second step, the support legs 102, 103 are pressed toward one another and, in a third step, are inserted through the spring clearance holes 44 of the middle and rear panels, 24, 26 and into the spring mounts 48 of the front panel 22. As shown in FIGS. 15 and 16. The support legs 102, 103 include clip ends 106, which in the embodiment shown, are configured as flanges that extend outward from the support legs 102, 103 so as to prevent the spring housing 100 from becoming detached when the bias of the spring 110 presses against the rear panel 26 of the shutter 20. The clip ends 106 also include inclined surfaces 108 to facilitate the insertion of the clip ends 106 into the spring mounts 48. In an embodiment, the third step of inserting the clip ends 106 of the support legs 102, 103 into spring mounts 48 can also perform steps one and two in that the spring will be compressed at the rear of the front panel 22 while being inserted and the support legs will be pressed toward each other by the inclined surfaces 108 of the clip ends 106 as they are inserted into the spring mounts 48. It is advantageous, however, to configure the spring 110 so that it fits relatively snugly within the spring housing 100 and between the support legs 102, 103 in order to stabilize the spring 110 and avoid bending, thereby providing a more controlled motion and ensuring a greater clearance and leakage distance as discussed below. In this case, it is also advantageous to perform all three steps when assembling the spring housing 100 into the shutter 20.

Figure 14:
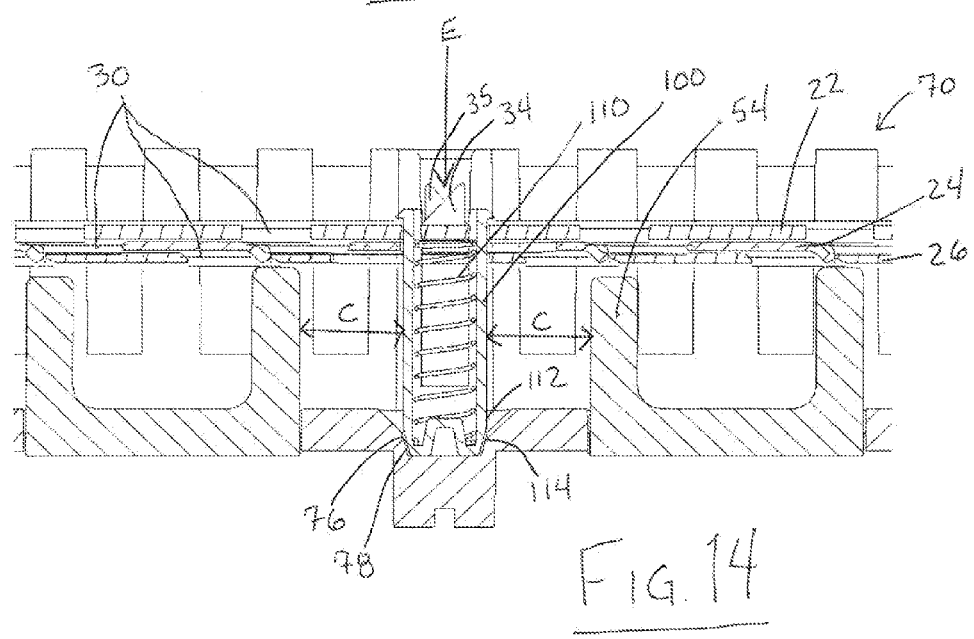
FIG. 14 is a detailed view of detail Z of FIG. 13.

Referring to FIGS. 13 and 14, the phase barriers 60 enter between the guides 34, 35 in direction E. As described above, the guides 34, 35 are then forced in opposite directions to slide the openings 30 of the middle and rear panels 24, 26 into substantial alignment with the openings 30 of the front panel in order to open the shutter 20. The phase barriers 60 also press the shutter 20 back against the force of the spring 110 toward the rear of the cabinet housing 70, thereby allowing the main contacts 54 to extend through the openings 30 and contact the contact cages 62 such that the withdrawable unit 10 is in the connected position of FIG. 3. When disconnecting the withdrawable unit 10 (see FIG. 2), the force of the springs 110 press the shutter 20 back forward to the pulled-out and closed position.

The spring housing 100 according to an embodiment of the present invention increases the leakage distance and clearance C between the spring 110 and the main contacts 54, which are typically made of copper, by at least partially surrounding the spring 110, thereby decreasing the likelihood of an arc forming therebetween. Moreover, the clearance C is also stably maintained since the base 112 stabilizes the spring housing 100 within the mounting holes 76 of the cabinet housing 70. The mounting holes 76 can include entering guides 78 and the base 112 can include corresponding entering guides 114 which allow the shutter 20 to be easily mounted by a customer within an electrical cabinet.

As described above, it is possible to use only two panels, for example, the front panel 22 and rear panel 26. Additionally, the order of the panels 22, 24, 26 may be interchanged such that, for example, the front and middle panels 22, 24 slide relative to the rear panel 26, which would then contain the spring mounts 48. Moreover, the shutter 20 can be used for a variety of installations and the same shutter can be used for both the line and load side.

While the invention has been particularly shown and described with reference to preferred embodiments thereof, it will be understood by those skilled in the art that various changes in form and details may be made therein without departing from the spirit and scope of the invention. Further, the present invention is not limited to the embodiments described herein; reference should be had to the appended claims

What is claimed is:

1. A shutter for insulating electrical contacts comprising:
a first panel including a first opening and a second panel including a second opening, the first opening being offset from the second opening when the shutter is in a closed position, the second panel including a first guide configured to react to a pressure of a phase barrier of an insertable withdrawable unit thereon to move the second panel in a first sliding direction relative to the first panel such that the first and second openings align so as to allow an electrical contact to extend therethrough; and
a spring housing having a spring disposed therein between at least two support legs slidably disposed in the first panel and extending through the second panel.

2. The shutter according to claim 1, further comprising a third panel including a third opening that is offset from the first and second openings when the shutter is in the closed position, the third panel including a second guide overlapping the first guide in a direction of movement of the phase barrier and configured to react to the pressure of the phase barrier thereon to move the third panel in a second sliding direction relative to the first panel.

3. The shutter according to claim 2, wherein the second sliding direction is opposite to the first sliding direction.

4. The shutter according to claim 3, wherein the guides include inclined surfaces that are inclined toward one another in the direction of movement of the phase barrier.

5. The shutter according to claim 1, wherein the spring housing includes a base configured to be held by a mounting hole of a cabinet housing so as to provide a stabile clearance on each side of the spring between the spring and the electrical contacts.

6. The shutter according to claim 5, wherein the mounting hole includes an entering guide and the base includes a corresponding entering guide.

7. The shutter according to claim 5, wherein the spring is formed from a metal and disposed in close arrangement with the at least two support legs.

8. The shutter according to claim 1, wherein the spring is disposed so as to be compressed by the first panel as the withdrawable unit is inserted toward a connected position with the electrical contact.

9. The shutter according to claim 1, further comprising three additional spring housings slidably disposable in the first panel with the spring housing arranged so as to be evenly positioned between adjacent pairs of electrical contacts.

10. The shutter according to claim 1, wherein the at least two support legs include clip ends that are connectable in the first panel through spring mounts in the first panel.

11. The shutter according to claim 1, further comprising a lock support configured to lock the shutter in the closed position.

12. A withdrawable unit for an electrical cabinet comprising:
a withdrawable part including a circuit breaker, at least one phase barrier and at least one contact cage;
a fix-mounted part configured to mount to a cabinet housing that includes electrical contacts, the withdrawable part being movable in the fix-mounted part from a disconnected position to a connected position in which the at least one contact cage makes contact with at least one of the electrical contacts; and
a shutter configured to mount on the cabinet housing so as to cover the electrical contacts, the shutter including:
a first panel including a first opening and a second panel including a second opening, the first opening being offset from the second opening when the withdrawable part is in the disconnected position, the second panel including a first guide configured to react to a pressure of the at least one phase barrier when the withdrawable part is moved to the connected position to move the second panel in a first sliding direction relative to the first panel such that the first and second openings align so as to allow the at least one of the electrical contacts to extend therethrough; and
a spring housing having a spring disposed therein between at least two support legs slidably disposed in the first panel and extending through the second panel.

13. The withdrawable unit according to claim 12, wherein the shutter further comprises a third panel including a third opening that is offset from the first and second openings when the shutter is in a closed position, the third panel including a second guide overlapping the first guide in a direction of movement of the phase barrier and configured to react to the pressure of the phase barrier thereon to move the third panel in a second sliding direction relative to the first panel.

14. The withdrawable unit according to claim 12, wherein the spring housing includes a base configured to be supported within a mounting hole of the cabinet housing.

15. The withdrawable unit according to claim 14, wherein each mounting hole includes an entering guide and each base includes a corresponding entering guide.

16. A method of assembling a shutter comprising:
compressing a spring disposed in a spring housing between at least two support legs;
pressing the at least two support legs toward one another; and inserting the at least two support legs into spring mounts of a first panel through a sliding support hole of a second panel that is adjacent the first panel such that the spring is biased against the first panel and allows the second panel to be slidable relative to the first panel so as to open and close the shutter.

17. The method according to claim 16, further comprising installing the shutter in a cabinet housing so as to cover metrical contacts.

18. The method according to claim 17, wherein the step of installing the shutter further includes aligning a base of the spring housing with a mounting hole of the cabinet housing.

19. The method according to claim 18, wherein the aligning is provided by an entering guide of the mounting hole and a corresponding entering guide of the base such that the base is closely held in the mounting hole.

20. The method according to claim 17, wherein the step of installing the shutter further includes fastening the shutter to clips of an extension of the cabinet housing so as to allow the shutter to move in the clips toward the electrical contacts.

21. The shutter according to claim 1, wherein the first guide has at least one of a curved and inclined surface disposed so as to face the phase barrier and move the second panel in the first sliding direction as the phase barrier is pressed slidingly along the at least one of the curved and inclined surface.

22. The withdrawable unit according to claim 12, wherein the first guide has at least one of a curved and inclined surface disposed so as to face the phase barrier and move the second panel in the first sliding direction as the phase barrier is pressed slidingly along the at least one of the curved and inclined surface.

\* \* \* \* \*